US010556341B2

(12) United States Patent
Geissdörfer et al.

(10) Patent No.: US 10,556,341 B2
(45) Date of Patent: Feb. 11, 2020

(54) TRAJECTORY DETERMINATION METHOD FOR NON-PRODUCTIVE MOVEMENTS

(71) Applicant: Siemens Aktiengesellschaft, München (DE)

(72) Inventors: Klaus Geissdörfer, Erlangen (DE); Carsten Hamm, Eggolsheim (DE); Hartmut Linke, Erlangen (DE); Elmar Schäfers, Fürth (DE)

(73) Assignee: Siemens Aktiengesellschaft, München (DE)

( * ) Notice: Subject to any disclaimer, the term of this patent is extended or adjusted under 35 U.S.C. 154(b) by 59 days.

(21) Appl. No.: 15/742,787

(22) PCT Filed: Jun. 3, 2016

(86) PCT No.: PCT/EP2016/062588
§ 371 (c)(1),
(2) Date: Jan. 8, 2018

(87) PCT Pub. No.: WO2017/005428
PCT Pub. Date: Jan. 12, 2017

(65) Prior Publication Data
US 2018/0200887 A1 Jul. 19, 2018

(30) Foreign Application Priority Data

Jul. 9, 2015 (EP) .................................... 15176108

(51) Int. Cl.
*G05B 19/4061* (2006.01)
*G05B 19/4069* (2006.01)
(Continued)

(52) U.S. Cl.
CPC ........ *B25J 9/1666* (2013.01); *G05B 19/4061* (2013.01); *G05B 19/4069* (2013.01)

(58) Field of Classification Search
CPC ................ G05B 19/404; G05B 19/414; G05B 19/4061; G05B 19/4069; G06F 17/50
(Continued)

(56) References Cited

U.S. PATENT DOCUMENTS 6,266,570 B1 7/2001 Hocherl et al.
6,982,536 B2 1/2006 Geissdörfer et al.
(Continued)

FOREIGN PATENT DOCUMENTS

CN 1208474 A 2/1999
CN 101512453 A 8/2009
(Continued)

OTHER PUBLICATIONS

Constantinescu D et al: "Smooth and time-optimal trajectory planning for Industrial manipulators along specified paths"; Journal of Robotic Systems; vol. 17; No. 5; pp. 233-249; XP055241165; ISSN: 0741-2223, DOI:10.1002/(SICI)1097-4563(200005)17:5<233:A; 2000.
(Continued)

*Primary Examiner* — Michael J Brown
(74) *Attorney, Agent, or Firm* — Henry M. Feiereisen LLC (57) ABSTRACT

The invention relates to a method (100) for determining an optimised trajectory for a non-productive movement of a tool (10) of a machine tool, from a starting position (12) to an end position (14). The non-productive movement is carried out in a spatially restricted travelling area (20) which is represented by geometric conditions. The method according to the invention is executed with the avoidance of collisions and comprises the step of determining a first trajectory (32) of the tool (10) by means of a travel-finding algorithm. In this step, the first trajectory (32) is optimised for the non-productive movement with respect to at least one selectable target parameter.

12 Claims, 3 Drawing Sheets

(51) Int. Cl.
*B25J 9/16* (2006.01)
*G05B 19/404* (2006.01)
*G05B 19/414* (2006.01)
*G06F 17/50* (2006.01)

(58) Field of Classification Search
USPC .................................................. 700/69
See application file for complete search history.

(56) References Cited

U.S. PATENT DOCUMENTS

| | | |
|---|---|---|
| 7,107,119 B2 | 9/2006 | Geissdörfer et al. |
| 7,236,913 B2 | 6/2007 | Hamm et al. |
| 7,299,108 B2 | 11/2007 | Geissdörfer et al. |
| 7,902,785 B2 | 3/2011 | Denk et al. |
| 8,060,239 B2 * | 11/2011 | Hoffmann .............. G05B 19/19 700/172 |
| 8,157,752 B2 | 4/2012 | Landra et al. |
| 8,763,771 B2 | 7/2014 | Ladra et al. |
| 8,909,371 B2 | 12/2014 | Hamm |
| 8,955,789 B2 | 2/2015 | Bitterolf et al. |
| 8,978,503 B2 | 3/2015 | Dort et al. |
| 9,316,283 B2 | 4/2016 | Ladra et al. |
| 9,555,546 B2 | 1/2017 | Hamm et al. |
| 9,740,179 B2 | 8/2017 | Ladra et al. |
| 2010/0092262 A1 | 4/2010 | Hamann et al. |
| 2010/0146802 A1 | 6/2010 | Ehlerding |
| 2011/0196533 A1 | 8/2011 | Scheurer |
| 2013/0151008 A1 | 6/2013 | Bosscher |
| 2013/0160143 A1 | 6/2013 | Hamm et al. |
| 2015/0039122 A1 | 2/2015 | Barakchi Fard et al. |
| 2015/0355647 A1 | 12/2015 | Bitterolf et al. |
| 2016/0056794 A1 | 2/2016 | Geissdörfer et al. |

FOREIGN PATENT DOCUMENTS

| | | |
|---|---|---|
| CN | 101784969 A | 7/2010 |
| CN | 102152308 A | 8/2011 |
| CN | 102523737 A | 6/2012 |
| DE | 102015000291 A1 | 7/2015 |
| EP | 2793090 A1 | 10/2014 |
| WO | WO 2012069129 A1 | 5/2012 |

OTHER PUBLICATIONS

Biagiotti Luigi et al: "Dynamic Analysis of Trajectories"; In: Luigi Biagiotti, Claudia Melohlorri; "Trajectory Planning for Automatic Machines and Robots"; Springer-Verlag, Berlin Heidelberg; XP002752942; ISBN: 978-3-540-85628-3; pp. 318-331; DOI: 10.1007/978-3-540-85629-0,; 2008.

Gasparetto Alessandro et al: "Trajectory Planning in Robotics"; Mathematics in Computer Science; vol. 6; No. 3; pp. 269-279; XP035125437; SP Birkha User Verlag Basel, Basel; ISSN: 1661-8289, DOI: 10.1007/S11786-012-0123-8; 2012.

Qiang Zhang et al: "Smooth time-optimal tool trajectory generation for CNC manufacturing systems"; Journal of Manufacturing Systems., vol. 31; No. 3; pp. 280-287; XP055241164; ISSN: 0278-6125, DOI: 10.1016/j.jmsy.2012.06.001; 2012.

PCT International Search Report and Written Opinion of International Searching Authority dated Aug. 18, 2016 corresponding to PCT International Application No. PCT/EP2016/062588 filed Jun. 3, 2016.

* cited by examiner

FIG 3

TRAJECTORY DETERMINATION METHOD FOR NON-PRODUCTIVE MOVEMENTS

CROSS-REFERENCES TO RELATED APPLICATIONS

This application is the U.S. National Stage of International Application No. PCT/EP2016/062588, filed Jun. 3, 2016, which designated the United States and has been published as International Publication No. WO 2017/005428 and which claims the priority of European Patent Application, Serial No. 15176108.7, filed Jul. 9, 2015, pursuant to 35 U.S.C. 119(a)-(d).

BACKGROUND OF THE INVENTION

The invention relates to a method for determining a trajectory for a non-productive movement of a tool and to a corresponding program. The invention furthermore relates to a machine tool with at least one tool which is configured to implement the method according to the invention.

WO 2012/069129 A1 discloses a method for controlling a robot system in which a plurality of robots perform working steps in coordinated manner. The individual working steps here comprise segments which are separately optimized with regard to the segment time required therefor, with account being taken of the maximum admissible drive forces, drive torques and joint velocities. The working steps of the robots furthermore comprise synchronization points at which two or more robots simultaneously have to adopt a specific configuration, for example for payload transfer. A path velocity profile of a trajectory between two poses of a robot is optimized to more closely adjust the sequence of the individual segments. A plurality of quality criteria, in particular oscillatory stress, inverter losses and energy requirement, which are weighted, are used for this purpose.

EP 2 793 090 A1 discloses an additive manufacturing process in which an additive manufacturing tool applies material in a plane. In a subsequent step, the applied material is bonded to surrounding material with a laser and hardened. A spline which joins a profile leading edge to a profile trailing edge of an aerodynamic profile to be produced is followed during application of the material.

The known methods have the disadvantage that the paths followed during the non-productive movements of the manufacturing tool or robot require a considerable amount of time.

It is furthermore indispensable for non-productive movements to provide a high level of collision safety. Ensuring this requires accurate tool path calculations which entails stringent requirements in terms of computing power. The object of the invention is that of providing a method for determining a trajectory for non-productive movements of a tool which overcomes the disadvantages of the prior art. A method is to be provided which simultaneously offers a high level of collision safety and time savings during the non-productive movement and can be implemented cost-effectively using simple hardware.

SUMMARY OF THE INVENTION

The stated object is achieved by the claimed method for determining an optimized trajectory. The method according to the invention is here designed for non-productive movements. A non-productive movement is any movement of a tool in a machine tool, in which no machining of a workpiece occurs. Machine tools on which the method according to the invention is performed are typically NC and CNC machine tools. Non-productive movements are for example return movements for a tool after a workpiece machining operation to a starting point from which a subsequent workpiece machining operation is to be begun. The tool of the machine tool is here moved in a spatially bounded travel envelope. The travel envelope includes the clearance present between components of the machine tool itself, chucking means fastened therein and at least one workpiece. The travel envelope is furthermore defined by the fastening and mobility of the tool. The travel envelope is the spatial region accessible to the tool without collision during a manufacturing operation.

The respective location of the components of the machine tool, for example the walls of the machine tool, the chucking means present and the at least one workpiece define geometric conditions which must be complied with during the non-productive movement. Compliance with the geometric conditions should be taken to mean the avoidance of tool collisions. The travel envelope of the tool is thus modeled by the geometric conditions.

In one method step, a first trajectory for a desired non-productive movement is established by means of a pathfinding algorithm. The first trajectory is here a path from a starting position to an end position of the non-productive movement. The pathfinding algorithm is configured to optimize the first trajectory with regard to at least one selectable target parameter, for example the time requirement for the non-productive movement. Further selectable target parameters are the energy requirement for the non-productive movement or the machine tool power loss arising during the non-productive movement. The pathfinding algorithm furthermore uses as input the geometric conditions which, together with the target parameter, a starting position and an end position of the non-productive movement, define the computing task for the functional sequence of the pathfinding algorithm in the first method step. Furthermore, at least one instruction to a drive means of the tool which corresponds to the first trajectory is established on the basis of the first trajectory. The instruction is for example an instruction to accelerate along a tool movement axis.

Using a pathfinding algorithm achieves considerable time and energy savings in performing a non-productive movement. It is also possible to minimize power losses which arise and to minimize thermal loads which occur on the tool as a result of warm-running drive means. Furthermore, taking account of a combination of target parameters makes it possible to achieve an improved compromise between conflicting aims, for example saving time and saving energy. The only inputs required by the pathfinding algorithm are the starting position which is known in any event, the desired end position and the geometric conditions which model the travel envelope. As a consequence, the pathfinding algorithm can run autonomously, such that user intervention can be reduced.

In a preferred embodiment, the path control method comprises a further, subsequent method step in which a filter is applied computationally to the first trajectory. The filter is a model, stored in the machine tool controller, of the dynamic characteristics of the machine tool. The filter identifies instructions to the machine tool which are capable of bringing about unintended and/or excessively high-wear movement of the tool. Such instructions are reduced to a tolerable level or completely suppressed by the filter in the machine tool. In the method according to the invention, application of the filter takes the form of a simulation of the first trajectory. The dynamic characteristics model the specifications of the tool and comprise maximum accelerations, maximum velocities and a characteristic for high-wear oscillations. The filter reflects these specifications overall in the form of dynamic characteristics.

The filter is used as the basis for establishing a second trajectory which the tool follows when it receives one or more instructions intended for following the first trajectory. The second trajectory here comprises a plurality of points which numerically model the second trajectory.

In a further method step, points of the second trajectory are each individually checked for compliance with the geometric conditions. Violation of a geometric condition is identified and detected if at least one point of the second trajectory does not meet a geometric condition.

In a further method step, a correction condition is identified on the basis of the detected violated geometric condition. The correction condition is one of the geometric conditions for input to the pathfinding algorithm and by the modification of which a collision-free non-productive movement can be achieved. The correction condition is a control variable for the pathfinding algorithm. The geometric conditions changed in this manner provide the pathfinding algorithm with a modified task for a rerun which leads to first and second trajectories which each differ from the first and second trajectories of the first run. Providing an input which has been modified in this manner for the pathfinding algorithm amounts to a correction step.

The claimed method is thus suitable for anticipating differences from the first trajectory brought about by a filter and for avoiding a collision. An anticipated collision risk is countered by the identification of the correction condition. The method according to the invention thus prevents damage to the machine tool and simultaneously provides an optimized trajectory for a non-productive movement which saves time or energy and/or avoids heat.

In one particularly preferred embodiment of the path control method, the actual dimensions of the travel envelope are modeled in a first run of the described method steps using the geometric conditions which serve as input to the pathfinding algorithm. The safety margins of the tool from surfaces of machine tool components are also taken into account here. During a rerun of the described method steps, the geometric conditions which serve as input to the pathfinding algorithm vary from the actual dimensions of the travel envelope as a result of the modification of the correction condition while taking account of the safety margins. The described method steps are repeated until all path points of the second trajectory meet all the geometric conditions, such that no tool collision occurs.

Overall, the method according to the invention identifies how a computationally established first trajectory is actually implemented in the form of a second trajectory by a tool under the effect of a filter. It is checked whether the actually implementable second trajectory furthermore meets the indispensable geometric conditions for avoiding collision. If a geometric condition is violated, the pathfinding algorithm is provided with a modified task by modifying the input to the pathfinding algorithm until, having taken account of the filter, at least one optimized trajectory is obtained, the implementation of which on the machine tool brings about a non-productive movement which is collision-free and simultaneously optimized for at least one target parameter.

The method according to the invention makes it possible to arrive simply and with few runs at an optimized trajectory which generates a non-productive movement which is optimized with regard to a desired combination of target parameters. At least one instruction for a reliably collision-free non-productive movement is here established. A simple pathfinding algorithm which takes no account of the structural circumstances of the machine tool, for example the oscillatory behavior thereof, may be used for this purpose. As a consequence, the complexity of the method according to the invention is limited, such that it places low demands on the computing power used. This also enables cost-effective implementation of the method according to the invention in machine tools with simple control hardware. As a consequence, existing machine tools can straightforwardly be retrofitted with the method according to the invention. Furthermore, selecting the correction condition solves a complex planar or spatial task in surprisingly simple manner.

In the event of a second run of the above-described method steps in the method according to the invention, an associated first trajectory is in turn preferably established by the pathfinding algorithm. The pathfinding algorithm likewise in turn establishes at least one corresponding instruction for movement of the tool. A second trajectory is established by applying the filter to the first trajectory. The second trajectory is here the path actually followed by the tool when it is driven with at least one instruction derived from the second run using the first trajectory. The second trajectory of the second pass is here located between the first trajectory of the second pass and the second trajectory of the first pass. As a result, a new second trajectory, which is approximated to the first trajectory from the preceding run, is always established in a subsequent run of the above-described method steps. As a consequence, an approximation target for the subsequent run is simply defined using the first trajectory from the preceding run. The method according to the invention is consequently suitable for solving a complex planar or spatial optimization task by slight variation of a parameter or a geometric condition, so making the method more readily implementable on machine tools with simple hardware.

In a preferred embodiment of the invention, when violation of the geometric condition is identified, the path from the starting position to the target position is divided into segments along an overall direction of movement. A boundary of a segment may here be defined by an edge of an interfering contour, for example an edge of the workpiece. A desired target corridor for the non-productive movement of the tool is defined by at least two points in the region of the boundary of each segment. A collision is identified, if it is identified that a point of the second trajectory is located outside the target corridor in the region of the boundary of the segment. In a particularly preferred embodiment of the invention, such identification of a collision is performed separately for each segment along the overall direction of movement.

Alternatively, the collision may be identified if at least one point of the second trajectory overlaps a spatial region of one of the modeling geometric conditions.

In a preferred embodiment of the invention, the filter takes the form of a setpoint filter, in particular a high-pass filter, a low-pass filter, a bandpass filter, a bandstop filter or a multirate filter. The method according to the invention may thus be applied to tools with any conceivable form of setpoint filters. The method is suitable for processing and correcting any conceivable form of filter effects which are brought about by different types of filter. The claimed method autonomously adapts itself to the present task to find and perform an optimized trajectory for a non-productive movement.

In the method according to the invention, violation of the geometric conditions is preferably checked for all points of the second trajectory, such that it is also possible to detect a plurality of violated geometric conditions. A plurality of points of the second trajectory may furthermore violate a geometric constraint, for example if a segment of the second trajectory is located within a contour of an obstacle. At least one correction constraint is preferably assigned to each violated geometric condition. As a consequence, a plurality of violations of geometric conditions can be remedied in a single correction step. This permits a further reduction in the necessary runs of the claimed trajectory determination method. In a particularly preferred embodiment of the invention, a corrective measure is assigned to each violated geometric condition.

In a further preferred embodiment of the invention, the portion of the travel envelope which arises from the modified geometric conditions which serve as the input for the pathfinding algorithm is reduced in size during the correction step. During establishment of the first trajectory, only that portion of the travel envelope which does not violate the modified geometric conditions is accessible to the pathfinding algorithm. Only a reduced latitude is thus available to the pathfinding algorithm during a rerun. Surprisingly, in the method according to the invention, reducing the size of the region in which a solution to a planar or spatial task is sought results in the desired solution, namely the desired optimized trajectory for the non-productive movement, being established more quickly. As a result, the complexity of the method according to the invention is further reduced and implementability on simple hardware further improved.

In particular, in the method according to the invention the size of the portion of the travel envelope accessible to the pathfinding algorithm may be reduced by enlarging an interfering contour, increasing a drill hole exit height, reducing the size of an approach channel, and/or enlarging an inherent contour of the tool. Such variables are geometric conditions which are indispensable to the planning of tool use and are in any event available. The method according to the invention is consequently configured to establish, without additional user input, the optimized trajectory and at least one corresponding instruction for an optimized non-productive movement. The method according to the invention is thus automatable, so enhancing user convenience.

In a further preferred embodiment of the invention, the at least one target parameter is a time requirement or an energy requirement for the non-productive movement, or the power loss of the non-productive movement, and thus the evolution of heat during the non-productive movement. In a further embodiment of the invention, the pathfinding algorithm is configured to establish the first trajectory in optimized manner on the basis of a plurality of target parameters. The individual target parameters may here be weighted relative to one another.

The filter in the method according to the invention may preferably correspond to dynamic boundaries and/or an intended oscillation characteristic of the tool. As a result, an instruction to the machine tool, for example an instruction to accelerate the tool by a specific amount, is not executed or relayed in modified form to a drive means of the machine tool if the instruction itself violates a dynamic boundary. As a result, excessive loading of the tool is avoided. Similarly, an instruction which is capable of bringing about inadmissible tool oscillation is modified or suppressed by the filter. As a result, unintended loading of the tool is avoided and the service life of the tool extended.

In a further embodiment of the path control method according to the invention, at least one geometric condition comprises a time variance. A violated geometric condition is here identified also on the basis of time variance, such that a violated geometric condition requires an overlap of the spatial coordinates of the tool with a boundary of the travel envelope and an associated time overlap, i.e. simultaneity. As a result, a time change of the travel envelope during the non-productive movement, for example when a workpiece is moved onwards during the manufacturing process, may be taken into account. This permits better utilization of the available travel envelope during a manufacturing operation, such that the achievable time saving during the non-productive movement is further increased.

The instruction during the method according to the invention may furthermore be to bring about a translational and/or rotational velocity, a translational and/or rotational acceleration, and/or a translational and/or rotational jerk along a tool axis. The method according to the invention is configured to establish any conceivable instruction for moving a tool which can be implemented by the drive means. The method according to the invention is thus substantially universally suitable for driving the tool in any manner. As a result, the conceivable range of application is enlarged.

In a particularly preferred embodiment of the method according to the invention, an overshoot distance is also detected on detection of a violated geometric condition. The overshoot distance may for example be the number of adjacent points of the second trajectory which violate the same geometric condition. The overshoot distance is here a measure of how severely a geometric condition is violated. If it is identified in the second trajectory that the tool would collide for example with the wall of the machine tool, then the overshoot distance corresponds to the maximum depth of penetration of the second trajectory into the wall. In the event of a high maximum depth of penetration, a geometric condition is violated for example for a correspondingly large number of points of the second trajectory. The overshoot distance may also be detected for any further geometric condition, for example as a deviation from a desired path angle.

In an alternative embodiment of the invention, it is checked at each segment along the overall direction of movement whether, in the region of the boundary of the respective segment, the point of the second trajectory is located in the target corridor defined by at least two points. If the point of the second trajectory is located outside the target corridor, the distance of the point of the second trajectory from the closest point of the target corridor is calculated. The magnitude of the distance is here the overshoot distance to be established and serves as a measure of the extent of a modification to be made to the associated correction condition.

An increment for the modification to the correction condition is preferably detected on the basis of the overshoot distance. The greater is the overshoot distance, the greater is the increment during modification of the correction condition. As a result, as a function of the extent of the required correction to a previously calculated first and second trajectory, a corrective action or modification of a corresponding extent is made. The method according to the invention is, as a result, dynamically adaptable. Consequently, the at least one optimized trajectory which is required for an optimized non-productive movement may be established in a small number of runs of the method even in the event of strong filter effects. The necessary computing power and requirements placed on the hardware used are thus reduced.

The object of the invention is furthermore achieved by a program which serves to control a tool in a machine tool. The machine tool comprises at least one drive means which brings about a tool movement. This is preferably an electric motor for producing a translational or rotational movement of the tool. The program according to the invention is configured to execute at least one embodiment of the claimed trajectory determination method. The program furthermore outputs the at least one reference variable which has been established to the drive means such that the optimized non-productive movement is performed. The program according to the invention may replace or supplement existing tool control software as an update. As a result, the claimed path control method can be performed simply with an existing tool.

Similarly, the present object is achieved by a control unit for a machine tool which comprises a storage device and a computing unit and is configured to execute the program according to the invention. Further software which serves to operate the machine tool may also be stored on the control unit according to the invention. The control unit according to the invention can straightforwardly be added as a retrofit module to an existing machine tool or can replace an existing control unit.

The object is further achieved by the machine tool according to the invention. The machine tool comprises at least one tool and a control unit according to the invention. The control unit may take the form of a microcontroller or a computer. The claimed machine tool practically implements the method according to the invention on the basis of the claimed program and the claimed control unit.

BRIEF DESCRIPTION OF THE DRAWING

The invention is explained below in greater detail with reference to the embodiments shown in the figures, in which.

DETAILED DESCRIPTION OF PREFERRED EMBODIMENTS

Figure 1:
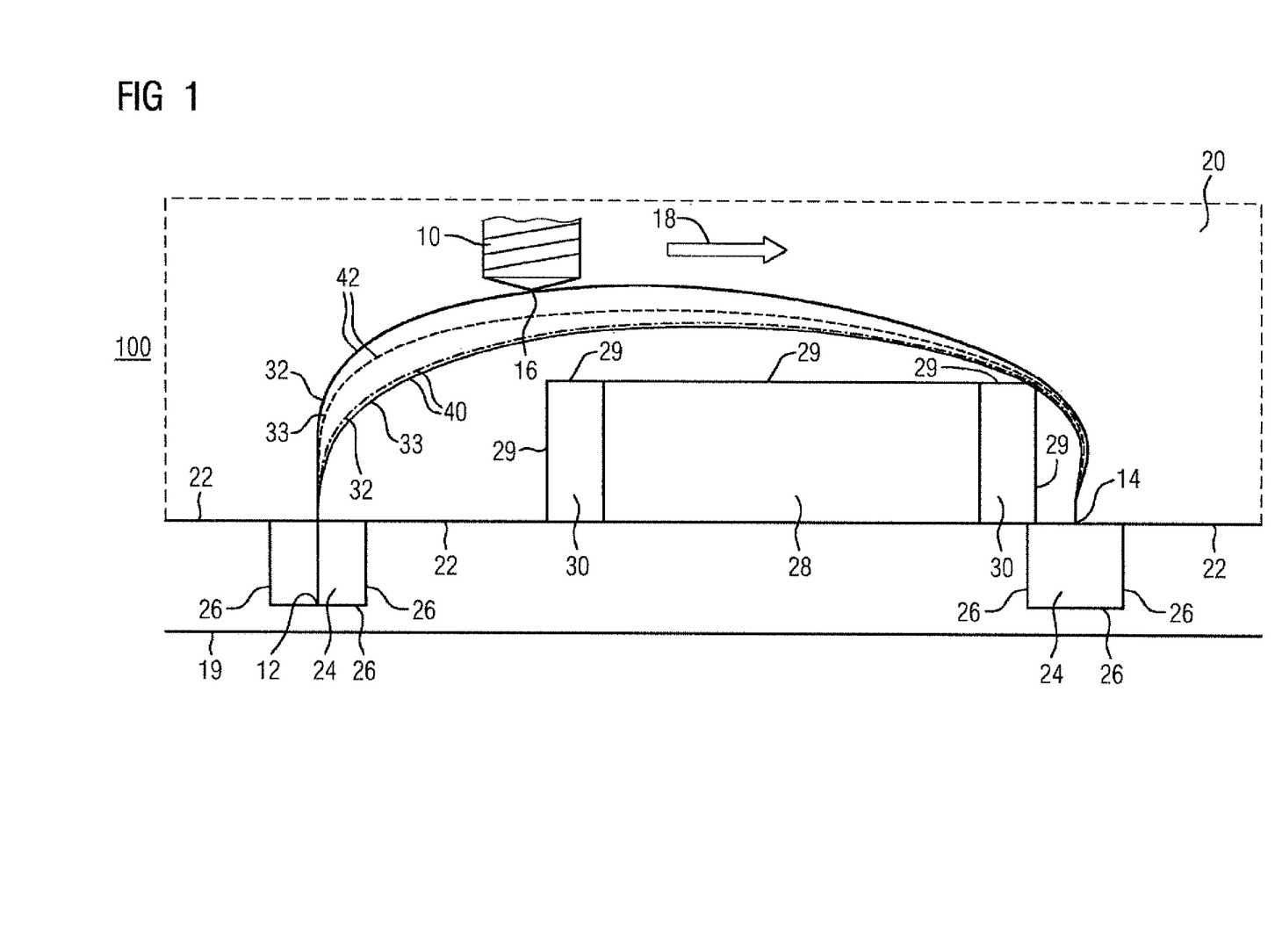
FIG. 1 is a schematic side view of a first embodiment of the path control method according to the invention.

FIG. 1 shows a first embodiment of the method 100 according to the invention in a side view. The task addressed by the method 100 is depicted in FIG. 1 as a planar projection of a spatial task. A tool 10 here moves in a travel envelope 20 which corresponds to the entire space which is accessible to the tool 10 without collision. In FIG. 1, the tool 10 is performing a non-productive movement which substantially proceeds in an overall direction of movement 18. The tool 10 is guided from the region of a recess 24 at a starting position 12 to the region of a recess 24 at a target position 14. The recesses 24 are provided in a workpiece contour 22 which extends substantially horizontally. The recesses 24 are furthermore bounded by walls 26 which adjoin one another.

The coordinates perpendicular to the illustrated overall direction of movement 18 are defined for the non-productive movement according to FIG. 1 relative to a reference plane 19. Tool reference point 16, which is substantially located at the tip of the tool 10, serves as the reference point for the non-productive movement of the tool 10. On moving from the starting position 12 to the target position 14, the tool 10 bypasses an obstacle 28. The obstacle contour 29 of the obstacle 28 reduces the size of the spatially bounded travel envelope 20 which is accessible without collision. The obstacle contour 29 additionally has a safety margin 30 applied which the tool 10 is not permitted to enter. It is therefore inadmissible for the tool 10 to penetrate the region which is defined by the obstacle contour 29 of the obstacle 28 itself and the safety margins 30.

FIG. 1 also shows a first trajectory 32 which is established by a pathfinding algorithm in a first run 40 of the claimed method 100. FIG. 1 likewise shows the second trajectory 33 which is calculated once the first trajectory 32 of the first run 40 has had the filter applied. The first trajectory 32 which is established by the pathfinding algorithm in a second run 42 of the method 100 according to the invention is likewise apparent from FIG. 1. The second trajectory 33 of the second run 42 of the method 100 according to the invention is furthermore depicted with a broken line. The functional sequence of the method 100 according to the invention is explained in greater detail in connection with FIG. 2 below.

Figure 2:
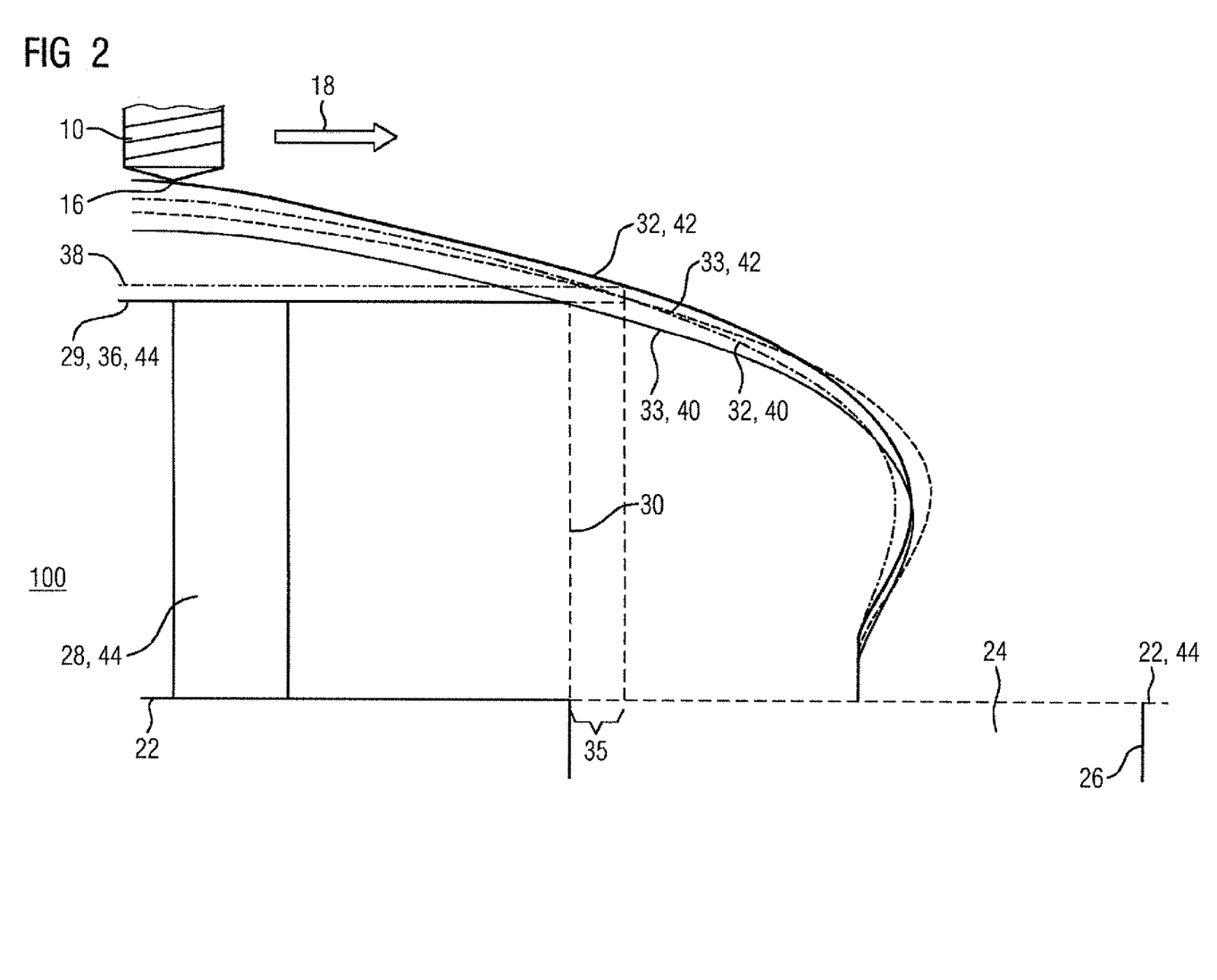
FIG. 2 is a schematic detail view of the first embodiment of the path control method according to the invention.

FIG. 2 shows a detail view of the functional sequence of the first embodiment of the method 100 according to the invention. The tool 10 is here again moving along the overall direction of movement 18. The trajectory traveled by the tool 10 is viewed on the basis of the tool reference point 16. The obstacle 28 is arranged on the workpiece contour 22, which obstacle is defined by its obstacle contour 29 and is arranged in the region of the recess 24 at the target position 14. A safety margin 30, which encloses the side face of the obstacle 28, is furthermore defined on the obstacle 28. The tool 10 is not permitted to penetrate into the region defined by the safety margin 30.

In the first run 40 of the method 100 according to the invention, the associated first trajectory 32 which bypasses the region defined by the obstacle contour 29 and the safety margin 30 is established. A plurality of instructions for moving the tool 10 correspond to the first trajectory 32 of the first run 40. In the method 100 according to the invention, the first trajectory 32 of the corresponding instructions has the filter applied computationally. Application of the filter substantially corresponds to a simulation of the execution of the instructions corresponding to the first trajectory 32 on the tool 10 and the resultant second trajectory 33 of the first run 40. The second trajectory 33 of the first run 40 intersects the region which is defined by the safety margin 30. Intersecting the region of the safety margin 30 by an overshoot distance 35 is detected as a violated geometric condition of the claimed method. The overshoot distance 35 is here a measure which defines the extent of a subsequent correction step.

Subsequently in the method according to the invention, a correction constraint 36 is detected by means of a correction step which is not shown in greater detail and the corresponding constraint is modified. The height of the obstacle 28 is identified as a correction condition and a changed contour 38 is transferred to the pathfinding algorithm as a modified geometric condition for a second run. The modification involves now using the changed height of a top of the obstacle 28 and the corresponding region of a safety margin 30 as the basis for the second run 42 of the pathfinding algorithm. The obstacle contour 29 itself is a rigid geometric condition 44, such that the obstacle contour 29 cannot be changed in such a way that the modified geometric condition 28 can be spatially located only outside the obstacle contour 29.

In the second run 42 of the pathfinding algorithm, an associated first trajectory 32 which will bypass the region which is defined by the modified geometric condition 38 is established. The second trajectory 33 of the second pass 42 is established by application of the first trajectory 32 of the second pass 42. The second trajectory 33 of the second pass 42 is located within the region which is defined by means of the modified geometric condition 39. The second trajectory 33 of the second pass 42 furthermore bypasses the obstacle 28 and the region of the safety margin 30. In the vicinity of the region of the safety margin. 30, the second trajectory 33 of the second pass 42 substantially corresponds to the first trajectory of the first pass 40.

The second run 42 of the pathfinding algorithm thus substantially involves establishing a second trajectory 33 which is corrected by the effects of the filter and corresponds to a calculated and desired first trajectory 32 in the first run 40. Overall, the second trajectory 33 of the second pass 42 is located between the first trajectory 32 of the first pass 40 and the first trajectory 32 of the second pass 42.

Figure 3:
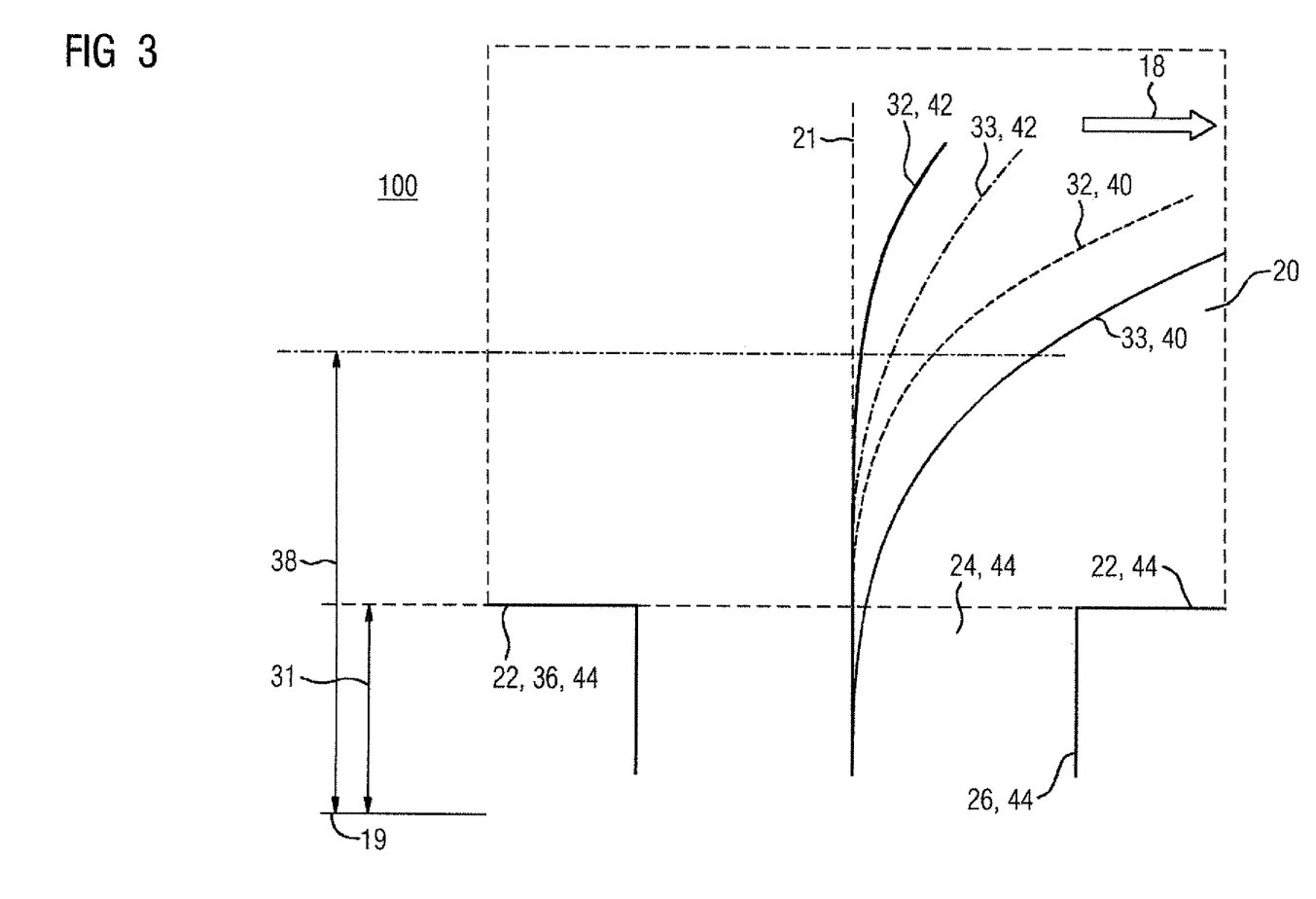
FIG. 3 is a schematic detail view of the second embodiment of the path control method according to the invention.

FIG. 3 depicts a detail view of a second embodiment of the method 100 according to the invention. The tool 10, not shown in greater detail, is being moved away from a starting position 12 in the region of a recess 24 in the workpiece contour 22. The tool 10 is here being moved in the travel envelope 20 which substantially corresponds to the clear space which is accessible without collision. The movement to a target position 14, not shown in greater detail, substantially proceeds along an overall direction of movement 18. The recess 24 bounded by walls 26 corresponds to a bore which is formed in the workpiece. The workpiece contour 22 and the walls 26 are here rigid constraints 44 which each define collision conditions. In the first run 40 of the pathfinding algorithm, a first trajectory 32 is established, in which, starting from the starting position 12, movement initially merely proceeds along a reference axis 21. The first trajectory 32 is located in the region of the recess 24 on the reference axis 21. Such a movement without a transverse component to the reference axis 21 ensures that the tool 10 does not collide with the wall 26.

Furthermore, in the method 100 according to the invention, the at least one instruction to the machine tool which is required for the first trajectory 32 and is obtained from the first pass 40 has the filter applied and the associated second trajectory 33 is established. The second trajectory 33 of the first pass 40 is path traveled by the tool 10 when the at least one instruction for the machine tool associated with the first pass 40 is used. In the region of the recess 24, the second trajectory 33 of the first pass 40 deviates from the reference axis 21. The deviation here has an overshoot distance 35 which is a measure of the extent by which the correction constraint 36 is to be modified in the second run 42. The deviation by the overshoot distance 35 creates a risk of a collision with the wall 26 of the recess 24.

The method 100 according to the invention identifies the exit height 31 from the recess 24 as the correction condition 36. The exit height 31 is here defined relative to the reference plane 19. In the correction step of the method 100 according to the invention, an exit height 38 raised relative to the reference plane 19 is used as a modified geometric condition for the second run 42. A first trajectory 32 which is substantially located on the reference axis 21 until the modified exit height 38 is reached is established by the pathfinding algorithm in the second run 42. At least one associated instruction which corresponds to the first trajectory 32 in the second run 42 is furthermore established. The at least one instruction to the tool 10 has the filter applied computationally, such that the second trajectory 33 of the second run 42 is established. The second trajectory 33 of the second run 42 here corresponds to the actual path followed by the tool 10 when it is driven with the at least one instruction, which second trajectory corresponds to the first trajectory 32 in the first run 40. In a further step of the method 100 according to the invention, it is checked whether all the points of the second trajectory 33 from the second pass 42 meet the geometric conditions, such that collisions of the tool 10 are avoided. FIG. 3 shows overall a planar projection of a spatial task.

What is claimed is:

1. A method for determining an optimized trajectory for a non-productive movement of a tool of a machine tool from a starting position to a target position in a spatially delimited travel envelope which is modeled by geometric conditions while avoiding collisions, comprising:
 a) establishing, with a pathfinding algorithm that does not take into account design features of the machine tool, a first trajectory of the tool, wherein the first trajectory is optimized for at least one selectable target parameter in the non-productive movement;
 b) establishing a second trajectory by applying to the first trajectory a filter that takes into account dynamic characteristics of the machine tool, wherein the filter is stored in a controller of the machine tool and comprises a model of the dynamic characteristics of the machine tool;
 c) identifying a collision when a geometric condition which models the travel envelope is violated at a point of the second trajectory, wherein, when the method is first executed, the geometric condition corresponds to surfaces of at least one obstacle delimiting the travel envelope, while taking into account safety margins;
 d) determining a correction condition that applies to the geometric condition and modifying the correction condition by at least one of enlarging an interfering contour, changing a drill hole exit height, reducing a size of an approach channel and enlarging an inherent contour of the tool; and
 e) repeating steps a) to d) until the geometric condition in step c) is met for all points of the second trajectory.

2. The method of claim 1, wherein a second trajectory of a second pass executing steps a) to d) is located between the first trajectory of the first pass and the first trajectory of the second pass.

3. The method of claim 1, wherein the filter is embodied as a setpoint filter, a high-pass filter, a low-pass filter, a bandpass filter, a bandstop filter or a multirate filter.

4. The method of claim 1, wherein at least one correction condition is assigned to each violated geometric condition.

5. The method of claim 1, wherein the correction condition at step d) reduces a size of a portion of the travel envelope accessible to the pathfinding algorithm.

6. The method of claim 1, wherein the at least one selectable target parameter is a path length of the non-productive movement, a time requirement for the non-productive movement, an energy consumption of the non-productive movement, or a power loss of the machine tool during the non-productive movement.

7. The method of claim 1, wherein the filter comprises a dynamic limit value of the machine tool, or an oscillation characteristic of the machine tool, or a combination thereof.

8. The method of claim 7, wherein at least one geometric condition comprises a time variance, and wherein step c) is executed by taking into account the time variance.

9. The method of claim 1, further comprising transmitting at least one instruction to a drive of the tool of the machine tool to cause the drive to impart on the tool a translational or rotational velocity, an acceleration or a translational or rotational jerk.

10. The method of claim 1, further comprising
at step c), detecting an overshoot distance of the violated geometric condition, and
at step d), determining, based on the detected overshoot distance, a step width for modifying the correction condition.

11. A program for controlling at least one drive of a tool of a machine tool, said program embodied in a non-transitory medium and comprising program instructions which when loaded into a control unit of the machine tool and executed in the control unit, cause a non-productive movement of the tool of the machine tool from a starting position to a target position in a spatially delimited travel envelope which is modeled by geometric conditions while avoiding collisions by:
a) establishing, with a pathfinding algorithm that does not take into account design features of the machine tool, a first trajectory of the tool, wherein the first trajectory is optimized for at least one selectable target parameter in the non-productive movement;
b) establishing a second trajectory by applying to the first trajectory a filter that takes into account dynamic characteristics of the machine tool, wherein the filter is stored in the control unit of the machine tool and comprises a model of the dynamic characteristics of the machine tool;
c) identifying a collision when a geometric condition which models the travel envelope is violated at a point of the second trajectory, wherein, when the method is first executed, the geometric condition corresponds to surfaces of at least one obstacle delimiting the travel envelope, while taking into account safety margins;
d) determining a correction condition that applies to the geometric condition and modifying the correction condition by at least one of enlarging an interfering contour, changing a drill hole exit height, reducing a size of an approach channel and enlarging an inherent contour of the tool; and
e) repeating steps a) to d) until the geometric condition in step c) is met for all points of the second trajectory.

12. A machine tool comprising at least one tool and a control unit configured to cause the tool, based on received program instructions, to execute an optimized trajectory for a non-productive movement of the tool from a starting position to a target position in a spatially delimited travel envelope which is modeled by geometric conditions while avoiding collisions, wherein the optimized trajectory is determined by:
a) establishing, with a pathfinding algorithm that does not take into account design features of the machine tool, a first trajectory of the tool, wherein the first trajectory is optimized for at least one selectable target parameter in the non-productive movement;
b) establishing a second trajectory by applying to the first trajectory a filter that takes into account dynamic characteristics of the machine tool, wherein the filter is stored in the control unit of the machine tool and comprises a model of the dynamic characteristics of the machine tool;
c) identifying a collision when a geometric condition which models the travel envelope is violated at a point of the second trajectory, wherein, when the method is first executed, the geometric condition corresponds to surfaces of at least one obstacle delimiting the travel envelope, while taking into account safety margins;
d) determining a correction condition that applies to the geometric condition and modifying the correction condition by at least one of enlarging an interfering contour, changing a drill hole exit height, reducing a size of an approach channel and enlarging an inherent contour of the tool; and
e) repeating steps a) to d) until the geometric condition in step c) is met for all points of the second trajectory.

* * * * *